United States Patent [19]

Sanders

[11] 4,349,859
[45] Sep. 14, 1982

[54] SHIELDED STRUCTURAL OR CONTAINMENT MEMBER

[75] Inventor: Laurence R. Sanders, St. Charles County, Mo.

[73] Assignee: McDonnell Douglas Corporation, St. Louis, Mo.

[21] Appl. No.: 190,458

[22] Filed: Sep. 24, 1980

[51] Int. Cl.$^3$ ............................................. B64D 45/02
[52] U.S. Cl. ..................................... 361/218; 244/1 A
[58] Field of Search ....................... 361/218; 244/1 A; 427/123, 313

[56] References Cited

U.S. PATENT DOCUMENTS 3,498,572  3/1970  Lumn ................................... 244/1 A
3,989,984  11/1976  Amason et al. ................. 244/1 A X

OTHER PUBLICATIONS

"Tin and Its Uses", Quarterly Journal of the Tin Research Institute, No. 108, 7/76.

*Primary Examiner*—Harry E. Moose, Jr.
*Attorney, Agent, or Firm*—Gravely, Lieder & Woodruff

[57] ABSTRACT

A member suitable for use at the exterior surface of an aircraft for structural or containment purposes includes a nonmetallic base or core and a thin electrical shield over that surface of the base that is presented outwardly. Preferably the base is a composite consisting of graphite fibers and a cured resin in which the fibers are embedded. The shield is tin or a tin alloy that is bonded to the surface of the base, preferably by metal spraying techniques. An electrical discharge, such as lightning, that attaches to the member is dissipated through the shield without impairing the strength or containment capabilities of the base.

12 Claims, No Drawings

SHIELDED STRUCTURAL OR CONTAINMENT MEMBER

BACKGROUND OF THE INVENTION

This invention relates in general to electrical shielding, and more particularly to a shielded structural or containment member, a member of that type used as part of an aircraft, and a process for producing such a member.

Lightweight nonmetallic materials, such as graphite epoxy composites, are finding widespread use in aircraft because of their high strength-to-weight ratios and their ability to be formed into complex configurations without expensive machining operations. However, these materials in and of themselves are quite vulnerable to lightning because, being generally nonconductive, they cannot dissipate electrical charges. Indeed, lightning will normally puncture and severely weaken a graphite epoxy composite. A puncture in the fuselage of an aircraft could cause the cabin to lose pressure, or much worse it could weaken the fuselage to the extent that it cannot perform its structural function. Also, a puncture near an electrical component may cause that component to malfunction.

One procedure for protecting a composite member involves adhesively bonding a thin foil or screen of aluminum to the outwardly presented surface of the member. Thus, in the event of a lightning strike, the electrical charge will dissipate through the metal of the foil or screen and will not concentrate at one specific area as would be the case without the metal shield. Sheet titanium may also be used for the shield. However, bonding a foil or screen to a composite is not easily done, and furthermore, the bonding is limited to flat or gently contoured parts, and certainly cannot be employed with parts having intricate contours. Also, foil bonding techniques are costly. Furthermore, the adhesive adds significantly to the weight of the shielded composite member. Aside from the foregoing problems, aluminum and carbon, the latter being the principal component of graphite epoxy composites, are not compatible from a chemical standpoint, and as a consequence the aluminum corrodes quite rapidly in the presence of the carbon. Titanium, on the other hand, is extremely expensive and difficult to work.

Another procedure currently used to protect composite members is to apply a thin coating of aluminum to the outwardly presented surface of the composite by arc, flame, or plasma spraying. Each of these techniques requires bringing the aluminum to a molten condition, and then transferring it to the surface of the composite. Aluminum melts at about 1200° F. and the transfer of the molten aluminum to the surface of the composite can cause thermal damage, particularly in the case of composite panels.

To avoid thermal damage, aluminum is sometimes applied to the mold in which the resin of the composite is cured, in which case the aluminum will bond to the resin. This process, which is known as transfer molding, is considerably more expensive than spraying the aluminum directly onto the cured composite material.

Because of its high melting temperature, titanium cannot be applied to the composite material by metal spraying techniques, but instead must be applied in sheet form.

SUMMARY OF THE INVENTION

One of the principal objects of the present invention is to provide a lightweight structural or containment member that is for the most part formed from a base material that is essentially a poor electrical conductor, yet includes a shield that covers the base material and is capable of dissipating high energy electrical charges without significant damage to the base material. Another object is to provide a shielded member of the type stated which is easy and inexpensive to manufacture. A further object is to provide a shielded member of the type stated in which the metal of the shield can be applied at relatively low temperatures so as to avoid damaging the underlying base material. An additional object is to provide a member of the type stated in which the base material and shield are chemically compatible so one does not corrode in the presence of the other. Still another object is to provide a process for producing a structural or containment member of the type stated by applying a metal shielding to a base material. Yet another object is to provide a member of the type stated that is ideally suited for use at the exterior surfaces of aircraft. These and other objects and advantages will become apparent hereinafter.

The present invention is embodied in a member including a nonmetallic base and a metallic shield over the base, the metal of the shield being tin or a tin alloy. It also resides in the member when used as part of an aircraft with the tin or tin alloy shield being exposed outwardly to the atmosphere on the aircraft. In addition, the invention includes a process for forming the member, that process including laying nonmetallic fibers into a desired arrangement, embedding the fibers in a hard and rigid matrix to form a base, and applying a thin coating of tin or tin alloy to the surface of the base to form the shield. The invention also consists in the parts and in the arrangements and combinations of parts hereinafter described and claimed.

DETAILED DESCRIPTION

The present invention is embodied in a shielded structural or containment member that consists essentially of a base formed from a material having relatively low electrical conductivity and a shield or cladding located over the base and formed from a material of high electrical conductivity. The base constitutes the load-bearing or rigidifying portion of the shielded member, while the shield protects the base from electrical discharges, such as lightning, in that any discharge that does attach to the member will be dissipated through the shield without impairing the structural or containment capabilities of the member. The base may be the skin that forms part of the fuselage or wings of an aircraft.

The base possesses considerable rigidity and from a structural standpoint it is suitable for carrying or resisting relatively heavy forces. Yet, the base is formed entirely from a nonmetallic material and as such is a relatively poor conductor of electricity. Preferably, the base is a composite material containing fibers and a cured resin matrix in which the fibers are embedded. The fibers impart strength to the base, enabling it to carry loads without fracturing, while the matrix holds those fibers together in essentially the rigid predetermined configuration in which they are best able to carry loads. The manner in which the fibers are laid up depends to a large measure on the configuration of the base and the use for which it is designed. For example, where the base is flat or gently contoured, the fibers may be fabric sheets or tape that are laid one upon the other. On the other hand, where the base is elongated or tubular it may be desirable to weave the fibers together into a three dimensional weave. Three dimensional fiber weaving is illustrated and described in U.S. Pat. Nos. 4,019,540 and 4,147,822.

The particular fibers that are in the composite material depend to a large measure on the use for which the composite is designed. Some suitable materials for the fibers are graphite, fiber glass, and Kelvar synthetic aromatic polyamide which is sold by DuPont. With the exception of graphite, all of these fibers are essentially dielectric materials. Graphite conducts electricity, but does so relatively poorly in comparison to metal. Furthermore, when embedded in the matrix, the fibers are for the most part isolated from each other from an electrical standpoint, so that if one is subjected to a high electrical discharge, the adjacent fibers are of little value in dissipating that charge. Indeed, tests have demonstrated that an unshielded base containing graphite fibers embedded in an epoxy matrix is severely damaged by electrical discharges such as lightning, all because the discharge does not dissipate through the base. Instead the charge remains concentrated at the point where it attaches to the surface of the composite base, and the energy of the charge is sufficient to penetrate the composite material. For this reason composite materials without any shielding should not be used along those surfaces of an aircraft which are likely to be struck by lightning. Such surfaces may include the nose cone, the forward fuselage, the leading edges of the wings, and the tail surfaces.

The matrix material is initially in a liquid form and is applied to the fabric or weave, after they have been laid up into the desired configuration, by immersing the weave or fabric lay up in the resin. The resin of course occupies the interstices of the weave or of the fabric lay up. In the alternative, the strands may be impregnated before being woven into the weave, or in the case of fabric, they may likewise be impregnated before being laid up into the layers for the base. In any event, the resin is cured by heating, which causes it to harden into the matrix that holds the fibers together in a predetermined arrangement. Epoxy resins are ideally suited for the matrix material, particularly when the fibers are graphite. Other suitable resins are polyesters, phenolics, and silicones.

The shield or cladding is a very thin layer, ranging between approximately 0.002 and 0.006 inches in thickness, that is bonded to and overlies the outwardly presented surface of the base. In other words, the shield, and not the base, is presented outwardly where it is exposed to electrical discharge such as lightning. The shield is formed from tin or a tin alloy, and is chemically compatible with graphite or whatever other substance the composite material of the base is formed. In this regard, tin and the carbon of the graphite are considerably closer in the electromotive series of elements, than aluminum and carbon, and as a consequence tin is less likely to corrode in the presence of carbon. Furthermore, tin melts at about 450° F., while aluminum melts at 1200° F., and therefore molten tin may be applied directly to the base by arc or flame spraying with considerably less danger of damaging the base. Aside from that, tin adheres better than aluminum to composite materials. In addition, tin is a low cost material that is readily available and easily applied by arc or flame spraying techniques.

To produce the structural or containment member, the composite base is formed using conventional techniques. More specifically, if the fibers are in the form of a fabric such as cloth or tape, then the layers of fabric are built up to the desired thickness. These layers may be impregnated with a resin before being laid up, or the entire stack of fabric layers may be immersed in the liquid resin to achieve the impregnation. Then the impregnated stack of fabric layers is heated under pressure to cure it. On the other hand, if the fibers are in the form of strands or yarn, they may be woven into the desired configuration. Again the strands may be preimpregnated with resin, in which case the resin for the matrix is already in place. If not, the weave is immersed in the liquid resin. In any event, the impregnated weave is thereafter heated to cure it, and this of course hardens the impregnated weave. The end result is the rigid base possessing a very high strength to weight ratio.

Next the tin shield is applied to that surface of the base which will be presented outwardly toward the atmosphere. This is best achieved by arc or flame spraying. In both of these processes tin is liquified and then driven onto the surface of base at considerable velocity. The liquid metal solidifies on and adheres to the surface, building up the shield thereon. Since tin melts at about 450° F., it can be deposited on the surface of the base at relatively lower temperatures. Moreover, these temperatures are well within the limits of most materials for the composite base including the graphite epoxy material.

To acquire good adhesion between the tin and the composite base, the surface of the base must be perfectly clean and should further be roughened slightly. One way to achieve this end is to cure the resin of the base against a suitable woven material such as nylon cloth. Upon completion of the cure, this material remains lightly adhered to surface of the base as a so-called peel ply. As such it protects that base surface from contamination, so that the surface need not be cleaned prior to the metal spraying. In fact, the peel ply is merely pulled off of the base, and immediately thereafter the liquid metal is sprayed onto the exposed surface. Not only does the peel ply protect the base from surface contamination, but it further imparts the roughened texture of its weave to the surface, and this of course causes the tin to adhere more firmly to the base.

Where the surface of the base is flat or gently contoured, the tin shield may be applied in the form of tin sheet which is adhesively or otherwise bonded to the base.

As another alternative, the tin may be sprayed onto a release material in the mold in which the composite base is cured. Then the uncured composite material is introduced into the mold where it is cured against the tin film. During the cure the tin adheres tightly to the composite material, so that when the composite material is removed from the mold, the tin comes with it as an exterior shield. This is known as transfer molding. The release material may be plastic film such as polyvinyl chloride.

The base need not be a composite material, but can be any material of low electrical conductivity. Of all these materials, composites composed of fibers and a matrix in which the fibers are embedded are probably the strongest.

Should an electrical discharge, such as a lightning bolt, strike the shielded member, the tin of the shield will vaporize in the region of the strike, and this in itself will dissipate some of the energy. The remainder is merely conducted through the shield and in that manner dissipated. While the strike may damage the shield and expose the base behind it, the base nevertheless will remain intact without any impairment of its load-carrying or containment capabilities.

This invention is intended to cover all changes and modifications of the example of the invention herein chosen for purposes of the disclosure which do not constitute departures from the spirit and scope of the invention.

What is claimed is:

1. In an aircraft, a structural or containment member that is exposed to the atmosphere at the exterior of the aircraft, said member comprising a base adapted to carry substantially all of any forces exerted on the member and being formed from a composite material that is a relatively poor conductor of electricity, the composite material including nonmetallic fibers and a resin matrix in which the fibers are embedded; and a thin metal shield adhered to and extended over that surface of the base that is presented outwardly with respect to the aircraft, the thin metal shield being exposed to the atmosphere at the exterior of the aircraft for dissipating an electrical charge that attaches to the member, the metal of the shield being tin or a tin alloy.

2. The structure according to claim 1 wherein the fibers are graphite.

3. The structure according to claim 1 wherein matrix is a cured epoxy resin.

4. The structure according to claim 1 wherein the shield is between approximately 0.002 and 0.006 inches thick.

5. The structure according to claim 1 wherein the fibers are graphite and the matrix is cured epoxy resin.

6. A process for producing a structural or containment member for an aircraft, with the member being capable of withstanding electrical discharges without impairing its strength or its containment capabilities; said process comprising: laying nonmetallic fibers into a desired arrangement; embedding the fibers in a hard and rigid resin matrix to form a base that is capable of carrying substantially all of any force exerted on the member; and applying a thin coating of tin or tin alloy to that surface of the base that is normally presented outwardly on the aircraft.

7. The process according to claim 6 wherein the step of applying a thin coating of tin to the surface of the base comprises spraying the tin or tin alloy onto the surface of the base.

8. The process according to claim 7 wherein the surface of the base is clean and has a roughened texture before the tin or tin alloy is sprayed onto it.

9. The process according to claim 6 wherein the fibers are graphite and the matrix is a cured resin.

10. The process according to claim 7 wherein the tin is in a molten condition when it is sprayed onto the base.

11. A process according to claim 6 wherein the resin of the matrix for the base is cured before any of the tin coating is applied to it.

12. A process according to claim 11 wherein the step of applying a thin coating of tin to the surface of the base comprises spraying a tin or tin alloy onto the surface of the base.

* * * * *